Aug. 29, 1950     A. S. PAGE     2,520,776
STEERING ASSEMBLY FOR LOADED TRUCKS AND TRAILERS
Filed Sept. 2, 1947     2 Sheets-Sheet 1
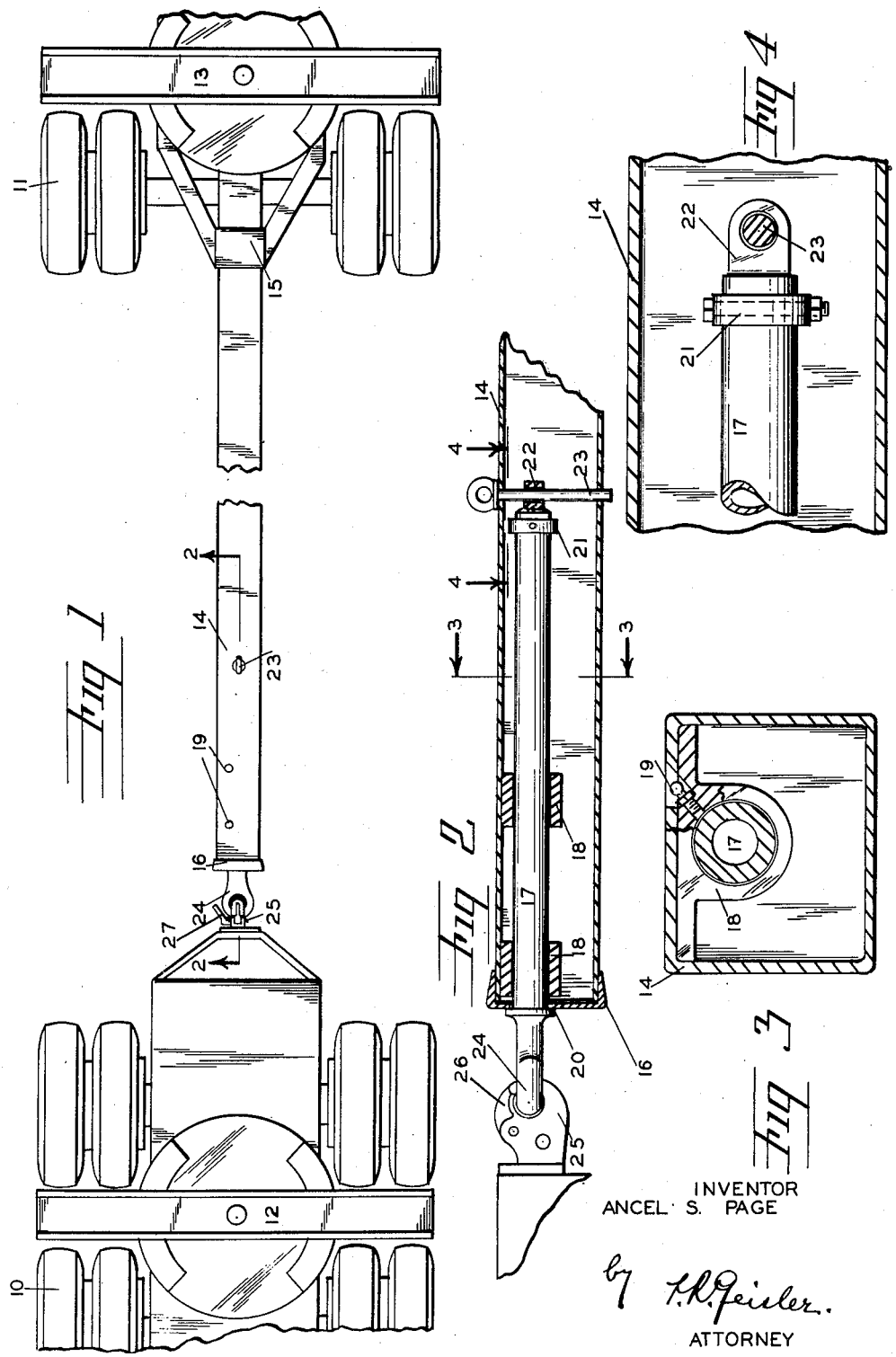
INVENTOR
ANCEL S. PAGE
ATTORNEY

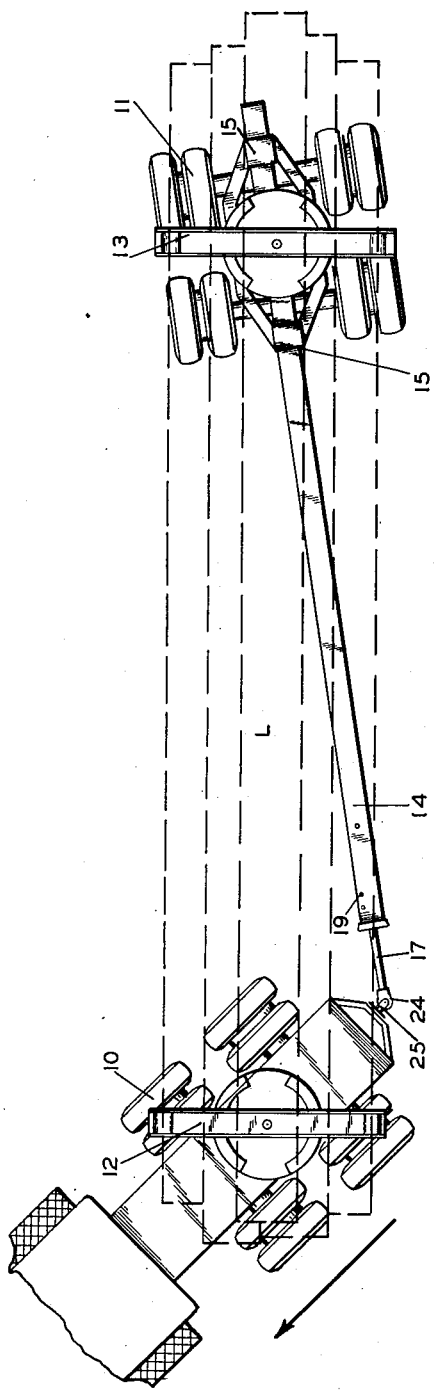

Patented Aug. 29, 1950

2,520,776

UNITED STATES PATENT OFFICE 2,520,776

STEERING ASSEMBLY FOR LOADED TRUCKS AND TRAILERS

Ancel S. Page, Portland, Oreg.

Application September 2, 1947, Serial No. 771,815

2 Claims. (Cl. 280—140)

This invention relates in general to means for connecting a towed or trailing vehicle to the towing or leading vehicle, and, more specifically, to the reach assembly by means of which a connection is maintained between a truck and an associated trailer.

In particular this invention relates to a reach assembly adapted to connect trucks and trailers of the type used for hauling logs, timbers, long pipes, and the like, where the front end of the load is carried by the truck and the rear end of the load is carried by the trailer.

In such hauling of long logs, for example, the front ends of the logs rest on a pivotally mounted bolster or bunk which is supported on the truck, and the rear ends of the logs rest on a similar bolster or bunk pivotally supported on the trailer. In order to steer the trailer under such conditions it is necessary to connect trailer and truck by means of a reach. The reach in such case does not serve the purpose of pulling the trailer when loaded, since the actual pulling of the trailer behind the truck is done by the logs, although, when no load is being carried the reach serves to pull the trailer as well as to steer it. In order to steer the trailer under all conditions the reach assembly must not only include a hinge connection, but, when a load is being carried jointly by the vehicles, provision must also be made to allow the effective length of the reach to be temporarily increased whenever one vehicle turns with respect to the other. The reason for this will be explained more fully later.

An object of the present invention is to provide an improved reach assembly for connecting the two vehicles, which will operate efficiently under all conditions regardless of whether a load is being carried by the vehicle or not.

It is not an uncommon occurrence in the hauling of log loads for the ordinary trailer reach to break off due to the fact that too much resistance is encountered when the reach attempts to accommodate itself to variations in length occasioned by the steering of the vehicle around a curve under a heavy load. While a slidable reach pole of one type or another is often provided in a reach assembly, connecting a log trailer and truck so as to permit variations in the effective reach length, the deposit of dirt or grit on the reach pole and in the reach pole mounting may, and often does, interfere with the free sliding adjustment of the reach pole to such an extent that the reach pole is finally broken. This results in considerable inconvenience and delay. In logging centers of the Northwest, broken trailer reaches occur very frequently.

A further object of this invention is to provide an improved reach assembly, adapted particularly for use in the logging industry and on unimproved logging roads, in which the slidable portion of the assembly will be protected against any accumulation of dirt and grit and in which a minimum amount of care is all that will be required to maintain the reach assembly in proper functioning condition indefinitely under all conditions of use.

An additional object is to provide an improved reach assembly construction which will be practical and simple to manufacture and install.

These objects and other advantages I attain by providing a reach assembly with a separate sliding member of moderate size and simple construction, slidably mounted within a special housing, which housing also constitutes an essential part of the reach assembly, and by constructing and arranging the assembly as hereinafter briefly described with reference to the accompanying drawings.

In the drawings:

Fig. 1 is a fragmentary plan view of one form of my improved reach assembly illustrated as connecting an ordinary logging trailer to a logging truck;

Fig. 2 is a fragmentary vertical section taken on line 2—2 of Fig. 1, but drawn to a larger scale;

Fig. 3 is a transverse section through the reach assembly, corresponding to line 3—3 of Fig. 2, drawn to a larger scale;

Fig. 4 is a fragmentary plan section, corresponding to line 4—4 of Fig. 2, drawn to the same scale as Fig. 3; and Fig. 5 is a plan view of a logging truck and trailer carrying a log load, employing the reach assembly of Fig. 1, and illustrating the elongation of the reach assembly which is necessitated when the loaded truck and trailer are being steered around a curve in the road.

Referring first to Figs. 1 and 5, the truck or leading vehicle is indicated in general by the reference character 10, and the trailing vehicle similarly by reference character 11. A pivotally mounted bunk or bolster 12 is mounted on the truck frame above the rear wheels of the truck and a similar bunk 13 is pivotally mounted on the trailer 11. The bunk 12 serves to support the forward end of the joint load L (Fig. 5), and the trailer bunk 13 similarly supports the rear end of the load.

An elongated hollow housing 14, preferably of rectangular cross-section, which may be fabricated in any convenient manner, for example, by welding channel members together along their longitudinal edges, extends horizontally through the center of the trailer frame and is rigidly secured to the trailer frame. If desired, this elongated housing 14 may be adjustably secured, by bolts or other means, in a pair of aligned sleeves 15 at the forward and rear ends of the diamond shaped frame of the trailer 11, as is customary with wooden reach poles on logging trailers, to enable the normal spacing between the two vehicles to be adjusted, for example, when considerably shorter logs are to be carried.

A cap 16 (Fig. 2) is secured over the outer or forward end of the elongated housing 14. The cap 16 is formed with an opening to accommodate a slidable bar 17 which is slidably supported in the housing in a pair of bearings 18 (see also Fig. 3). The bar 17 may be tubular as indicated in the drawings, or may be of any other desired cross-sectional formation, and the bearings 18 are so formed as to permit axial or longitudinal movement of the bar with respect to the housing without permitting any appreciable lateral play therein. A suitable grease fitting or sealed lubrication inlet 19, extending down from the top of the housing 14, is provided for each bearing 18, in order that the bar 17 may slide freely within the bearings and housing as and when desired, and the housing 14 serves a very important function of keeping dirt and grit out of the bearings 18. The bar 17 is preferably formed with a shoulder 20 (Fig. 2) which limits the extent of its inward movement in the housing 14, and a collar 21 is also preferably secured to the inner end of the bar to limit the outer movement of the bar and to prevent the bar 17 from becoming entirely disengaged from the housing inadvertently. The inner end of the bar 17 terminates in an eye loop 22 (Figs. 2 and 4), the axis of the opening through which loop is vertical, and a pair of aligned holes in the top and bottom faces of the housing 14 are so arranged as to enable a locking pin 23 to extend through these holes and through the eye 22 to lock the bar 17 in its inmost position in the housing 14 when desired.

The outer end of the slidable bar 17, located beyond the front end of housing 14, is formed into a coupling element, and a cooperating companion coupling element is secured to the rear end of the truck. Thus, in the construction illustrated in Figs. 1, 2 and 5 the forward or outer end of the bar 17 is formed into an eye element 24 and a companion hook element 25 is secured to the central portion of the rear end of the extended frame of the truck 10. When these two elements 24 and 25 are in coupled relationship, a pivotal joint is established between the forward end of the bar 17 and the truck 10 and consequently between trailer and truck.

Preferably the hook element 25 is formed with a hinged retainer 26 (Fig. 2) controlled by a locking lever 27 (Fig. 1), and the combined eye and hook elements constitute an engageable and disengageable coupling. This type of engageable and disengageable coupling may be constructed in various ways. The particular coupling illustrated is the same as that described in U. S. Letters Patent No. 2,124,839 to Weiss, dated July 26, 1938, and entitled Automobile Trailer Coupling. Other similar couplings, having one element attached to the bar 17 and the other element secured to the rear end of the truck, could also be satisfactorily employed in my reach assembly.

The operation of my reach assembly when a joint load is being carried by truck and trailer will now be explained with reference to Figs. 1 and 5. Prior to loading, the truck and trailer will generally be arranged approximately in alignment and substantially in the relative position indicated in Fig. 1. The bar 17 will be in its inmost position (this position being also shown in Fig. 2), but the pin 23 is withdrawn. When the load of logs has been loaded on the truck and trailer, with the front end of the load L resting on the truck bunk 12 and the rear end of the load resting on the trailer bunk 13, the reach assembly is no longer required or used for pulling the trailer, but serves merely to steer the loaded trailer. The logs themselves serve to pull the trailer, and, due to the weight of the logs on the two bunks 12 and 13, no longitudinal sliding of the logs on the bunks occurs and thus the two bunks 12 and 13 remain spaced the same distance apart at all times during the hauling of the load. If the truck and trailer were always to move forward in a straight line no provision for a self-adjusting steering reach assembly would be necessary, but since all roads have some curves, and logging roads particularly, it is necessary with a load such as that illustrated in Fig. 5 to make special provision for steering the trailer whenever the truck has to make a turn. From Fig. 5 it will be apparent that, when the truck 10 makes a turn to one side or the other, since the distance between the pivotal points of the truck and the trailer bunks 12 and 13 always remains the same, the reach assembly must be temporarily elongated. Thus the sliding of the bar 17 forwardly in the bearings within housing 14 enables this temporary elongation of the reach assembly to occur without any difficulty. Then, as the truck and trailer are again brought into alignment the length of the reach assembly must similarily be reduced and the bar 17, by sliding in the opposite direction in its bearings, enables the reach assembly automatically to accommodate itself to this necessary adjustment. It will also now be apparent from Fig. 5 that if anything were to prevent the reach assembly from changing its effective length under such conditions some part of the assembly would have to break. This explains why the sliding reach poles heretofore commonly used with logging trailers are so frequently snapped off, for if for any reason, such as accumulated grit and dirt in the reach pole mountings, sufficient resistance to the sliding of the reach pole develops, the pole is forced to break. My improved reach assembly provides a satisfactory solution for this problem. The housing 14 permits very little, if any, grit and dirt to enter the bearings 18, and an occasional lubrication of the bearings is all that is required to insure the necessary freedom of movement in the sliding of the bar 17. The relative small diameter of the bar 17 and its comparatively short length combine to aid in eliminating the difficulties heretofore encountered with slidably mounted, long, heavy reach poles.

When the load has been discharged from the truck and trailer and the unloaded trailer is to be towed behind the truck, the pin 23 is again inserted in the position shown in Fig. 2, for without any load, the reach assembly must then pull the trailer as well as steer it.

I claim:
1. The combination of a draft vehicle having a pivotally-mounted, load-supporting bunk, a trailer vehicle having a similar pivotally-mounted, load-supporting bunk, a load supported near its ends on said bunks respectively and serving as the draft hitch between said vehicles, and a steering reach for said trailer vehicle, said steering reach comprising an elongated hollow housing rigidly secured to the chassis of said trailer vehicle and extending forwardly from said trailer vehicle in alignment with the longitudinal center line of said trailer chassis for a distance slightly less than the normal spacing longitudinally between said vehicles, a slidable bar in the forward portion of said housing, the forward end of said bar extending from the forward end of said housing, and a pair of cooperating coupling elements connecting said bar and said draft vehicle and respectively secured to the forward end of said bar and the rear end of said draft vehicle.

2. The combination set forth in claim 1 with the addition of bearings in the forward portion of said housing for said bar and means for admitting lubricant into said bearings.

ANCEL S. PAGE.

REFERENCES CITED

The following references are of record in the file of this patent:

UNITED STATES PATENTS

| Number | Name | Date |
|---|---|---|
| 499,288 | Ewell | June 13, 1893 |
| 2,149,624 | Owen | Mar. 7, 1939 |
| 2,260,637 | Ovenhouse | Oct. 28, 1941 |
| 2,388,366 | Miller | Nov. 6, 1945 |